March 2, 1971 M. KEZIRIAN 3,566,496

FORM TOOL

Filed June 3, 1968

INVENTOR
MITCHELL KEZIRIAN
BY
Barlow & Barlow
ATTORNEYS,

United States Patent Office 3,566,496
Patented Mar. 2, 1971

---

3,566,496
FORM TOOL
Mitchell Kezirian, Cranston, R.I., assignor to
Precision Industries, Inc.
Filed June 3, 1968, Ser. No. 734,000
Int. Cl. B23g 5/00, 5/18; B26d 1/12, 1/00
U.S. Cl. 29—102                                        4 Claims

ABSTRACT OF THE DISCLOSURE

A form tool having an interchangeable insert with a means for accurately aligning the insert in the block and holding it in inserted position.

BACKGROUND OF THE INVENTION

Inserts in form tools have usually been brazed in position and as such are not replaceable. Inserts for rotary cutters and the like have been variously held in place and occasionally the holding means has been designed to have some aligning function for the insert. An example of this is in Miller Pat. 2,229,112. Usually all of the holding or aligning means which occurs with the holding means is on one side of the insert. However, there has been means on opposite sides of the insert such as shown in the Whitney Pat. 1,308,313 where an adjustment of the insert is on one side thereof and a tapered clamping pin is on the other side of the insert. The above-referred to inserts do not provide sufficiently accurate alignment for form cutters, so that when a form cutter has a preground insert interchanged there is a precise duplication of cutting position.

SUMMARY

This invention provides an interchangeable insert with each insert predeterminedly positioned by a groove in the insert being seated upon an aligning pin, the insert being fastened in position.

DESCRIPTION OF THE PREFERRED EMBODIMENT

Figure 1:
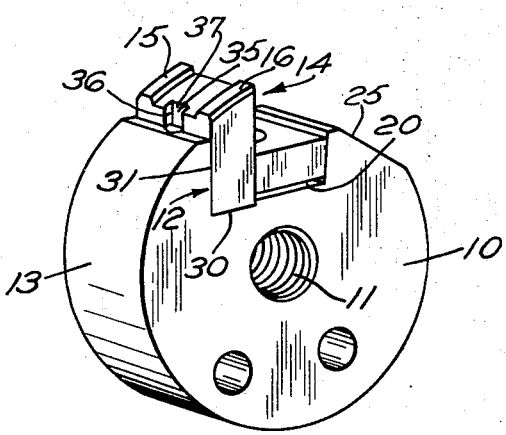
FIG. 1 is a perspective view of the circular form cutter with the cutting insert therein.

With reference to the drawings where a circular form tool is shown by way of example, 10 designates a generally cylindrical block having an axial threaded bore 11 for mounting the block on a machine tool spindle such as a screw machine as will be understood. The block has an outer cylindrical surface 13 with a portion thereof facing the work and a slot 12 is formed inwardly therefrom. This slot is for the reception of the formed cutting insert 14 which may have projections such as 15 and 16 thereon for providing a desired shape cut in the work. A second slot 20 also extends inwardly from the outer cylindrical surface for the reception of a clamping wedge 21 therein. This slot 20 also opens into the slot 12 so that the wedge will engage the insert 14 for effectively clamping it into position. The block 10 is cut away as at 25 for chip clearance.

Figure 4:
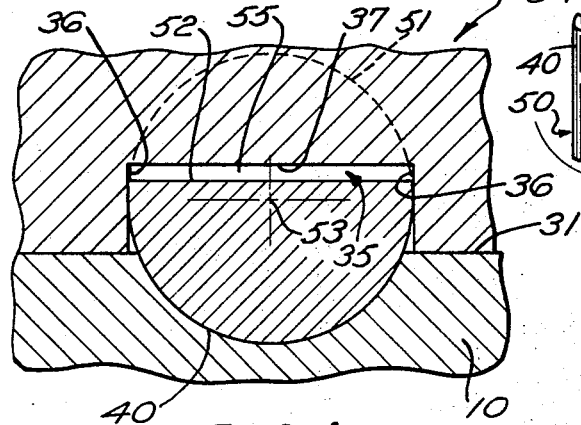
FIG. 4 is an enlarged fragmental sectional view through the cutter, the insert and the aligning pin.
Figure 3:
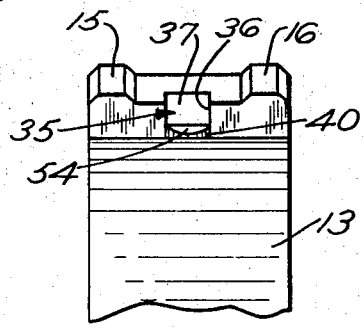
FIG. 3 is an edge view of the cutter.

The inwardly extending slot 12 has its longitudinal and transverse axes define a plane which extends inwardly parallel to the plane of the axis of the block 10 but not necessarily radial with respect to the center of the block. This slot 12 has an end wall 30 against which the insert 14 engages and also has a wall 31 against which the insert is forced by a clamping means to hold it in position. In order to align the insert 14 with the cylindrical block 10, a hole formation is provided partly in each part. The insert is provided with a channel 35 having side walls 36 at generally right angles to a bottom wall 37. A cylindrical hole 41 extends inwardly of the block and offset from the recess 12 beyond bottom wall 30 of recess 12 while an outward extension of this hole forms an arcuate groove or recess 40 in wall 31 registering with channel 35. An aligning pin 50 has a cylindrical portion 51 which is driven into the cylindrical hole 41 so as to have a tight fit therewith with a portion extending into the recess or groove 12. This pin is then ground off providing a flat cord 52 from its outer end 54 to a point in line with the bottom 30 of the groove or recess 12. This removed portion, however, does not extend to the center 53 of the cylindrical pin but rather leaves a portion of the pin beyond this center so that a full diameter of the pin is maintained to enter the groove 35 and engage the opposite side walls 36 thereof. This pin is also so sized with reference to the groove 35 that it does not touch the bottom 37 but rather leaves a clearance designated 55 therefrom (see FIG. 4). By this arrangement a very accurate alignment of the insert 14 is provided so that its alignment axially of the cylindrical block is had. Further, the pin serves to support the insert against any forces tending to dislodge the insert from the slot.

Figure 2:
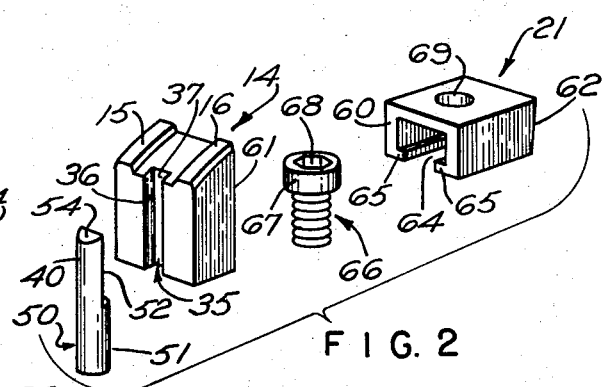
FIG. 2 is an exploded perspective view of the insert and its means for alignment and means for securing it in the cylindrical block.
Figure 5:
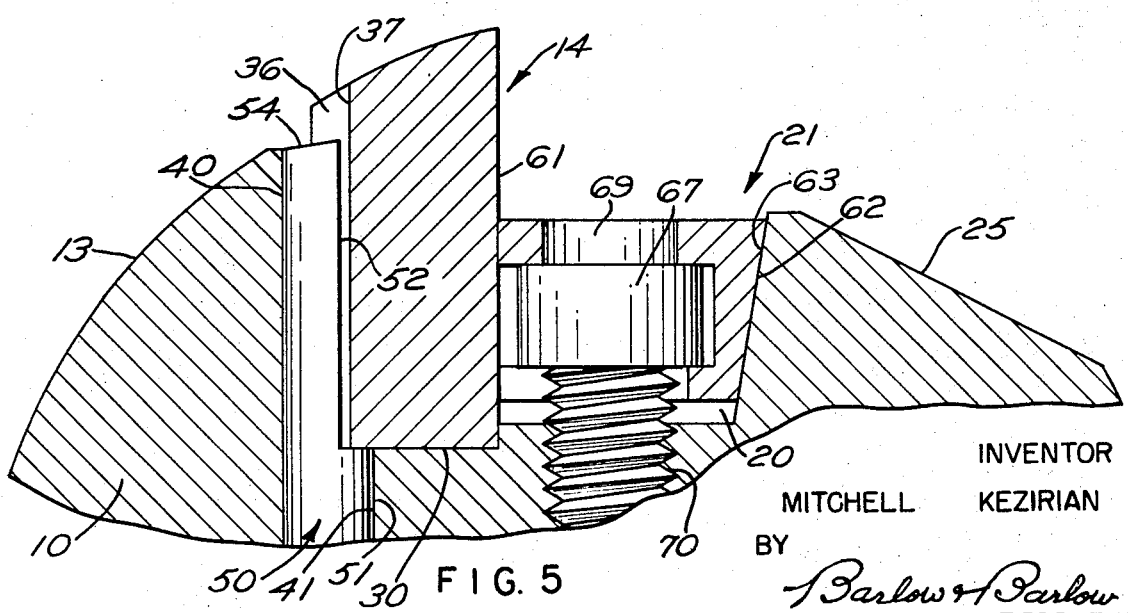
FIG. 5 is an enlarged sectional view at right angles to the showing of FIG. 4 illustrating a fragmental portion of the cylindrical block, the insert therein, the aligning pin and the clamping means.

In order to clamp this insert in position, the wedge 21 has an end wall 60 which engages throughout its length the face 61 of the insert. The opposite end wall 62, however, of this wedge is tapered and engages the tapered surface 63 of the slot 20. This wedge is channel shape along a portion of its length, as seen at 64 in FIG. 2, with inwardly extending lips 65 on either side of the channel. A screw 66 having a head 67 which fits this channel, as seen in FIG. 5, is provided with a socket recess 68 which may be engaged through hole 69 in the top wall of the wedge 21 and screwed into the threaded bore 70 extending inwardly from the bottom of the groove 20 which receives the clamping wedge 21. Thus as this screw is turned inwardly, its head, which overlaps the lips 65, forces the wedge downwardly and as downward movement occurs it is given lateral movement by reason of the inclined surfaces 62 and 63 to force its surface 60 against the insert and in turn force the insert 14 against wall 31 of the slot 12 to hold the insert in place.

It will be apparent that replacement inserts may be readily used in the above described construction, as three point alignment is provided—first by the pin, secondly by the wall 31 and thirdly by the end wall 30. Complete physical contact of the insert with walls 30 and 31 is assured by the wedge that, as illustrated in FIG. 5, creates downward and left lateral forces. Further to within normal tolerances the groove 35 aligns the insert in the third dimension.

I claim:

1. A form tool comprising a block having a surface facing the work means for mounting the block in use, said block having an insert-receiving slot extending inwardly from said surface, a cutting insert positioned in said insert-receiving slot, means to clamp said cutting insert in said insert-receiving slot, said block and insert having a pin receiving formation partly in each, the cutter insert formation being rectangular in cross-section and the block formation being circular in cross-section and a pin positioned in the block formation so as to predeterminedly position said insert with respect to said block along diametral lines of contact therebetween running along the entire length of the portion of the pin positioned in said slot.

2. A form tool as in claim 1 wherein said block has a second slot formed therein inwardly of said surface and contiguous to the insert-receiving slot, and said means includes a clamping wedge in said second slot.

3. A form tool as in claim 1 wherein said block has a second slot formed therein inwardly of said surface and contiguous to the insert-receiving slot, and said means includes a clamping wedge in said second slot, said hole formation being on the opposite side of the cutting insert from said second slot.

4. A form tool as in claim 1 wherein said pin has an anchoring portion wholly in said block and a portion of a size to engage the opposite walls of the rectangular formation in said insert to locate the insert axially of the block and of a size to be spaced from the bottom of the rectangular formation in said insert which joins the opposite walls.

References Cited

UNITED STATES PATENTS

| | | | |
|---|---|---|---|
| 1,037,146 | 8/1912 | Hunter | 29—105 |
| 1,046,737 | 12/1912 | Conklin | 29—105 |
| 1,308,313 | 7/1919 | Whitney | 29—105 |
| 1,538,929 | 5/1925 | De Vlieg | 29—105 |
| 1,714,098 | 5/1929 | Miller | 29—105 |
| 3,363,299 | 1/1968 | Gowanlock | 29—105 |
| 3,408,722 | 11/1968 | Berry | 29—105 |

CHARLES W. LANHAM, Primary Examiner

E. M. COMBS, Assistant Examiner

U.S. Cl. X.R.

10—102; 29—105